United States Patent
Seifert

(10) Patent No.: US 11,086,095 B2
(45) Date of Patent: Aug. 10, 2021

(54) ADJUSTABLE MECHANICAL HOLDER FOR FINELY ADJUSTING THE POSITION OF AN ELEMENT SUCH AS A LENS

(71) Applicant: Leica Microsystems CMS GmbH, Wetzlar (DE)

(72) Inventor: Roland Seifert, Heidelberg (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 171 days.

(21) Appl. No.: 16/584,961

(22) Filed: Sep. 27, 2019

(65) Prior Publication Data

US 2020/0103614 A1 Apr. 2, 2020

(30) Foreign Application Priority Data

Oct. 2, 2018 (DE) ...................... 10 2018 216 951.9

(51) Int. Cl.
*G02B 7/02* (2021.01)

(52) U.S. Cl.
CPC .................................... *G02B 7/023* (2013.01)

(58) Field of Classification Search
CPC ......... G02B 7/023; G02B 7/004; G02B 7/022
USPC ........................................................ 359/822
See application file for complete search history.

(56) References Cited

U.S. PATENT DOCUMENTS

| 9,323,025 | B2 | 4/2016 | Heidemann et al. |
| 2011/0255182 | A1 | 10/2011 | Calvet et al. |
| 2018/0335178 | A1* | 11/2018 | Bin .................. F16M 11/18 |

FOREIGN PATENT DOCUMENTS

| DE | 3721682 A1 | 4/1988 |
| DE | 9216220 U1 | 4/1994 |
| DE | 102009025309 A1 | 12/2010 |
| JP | S62-109008 A | 5/1987 |
| JP | H06-259795 A | 9/1994 |

* cited by examiner

*Primary Examiner* — James C. Jones

(74) *Attorney, Agent, or Firm* — Leydig, Voit & Mayer, Ltd.

(57) ABSTRACT

An adjustable mechanical holder for finely adjusting a position of an element attachable or attached to the mechanical holder includes a stationary fastening region configured to fasten the mechanical holder to a holding structure and a holding region configured as a mounting for the element. At least a first parallelogram linkage is disposed between the holding region and the fastening region. The first parallelogram linkage connects the holding region movably to the fastening region. The mechanical holder further includes a first movable actuator, by which the holding region is movable by the first parallelogram linkage along a first spatial direction.

17 Claims, 5 Drawing Sheets

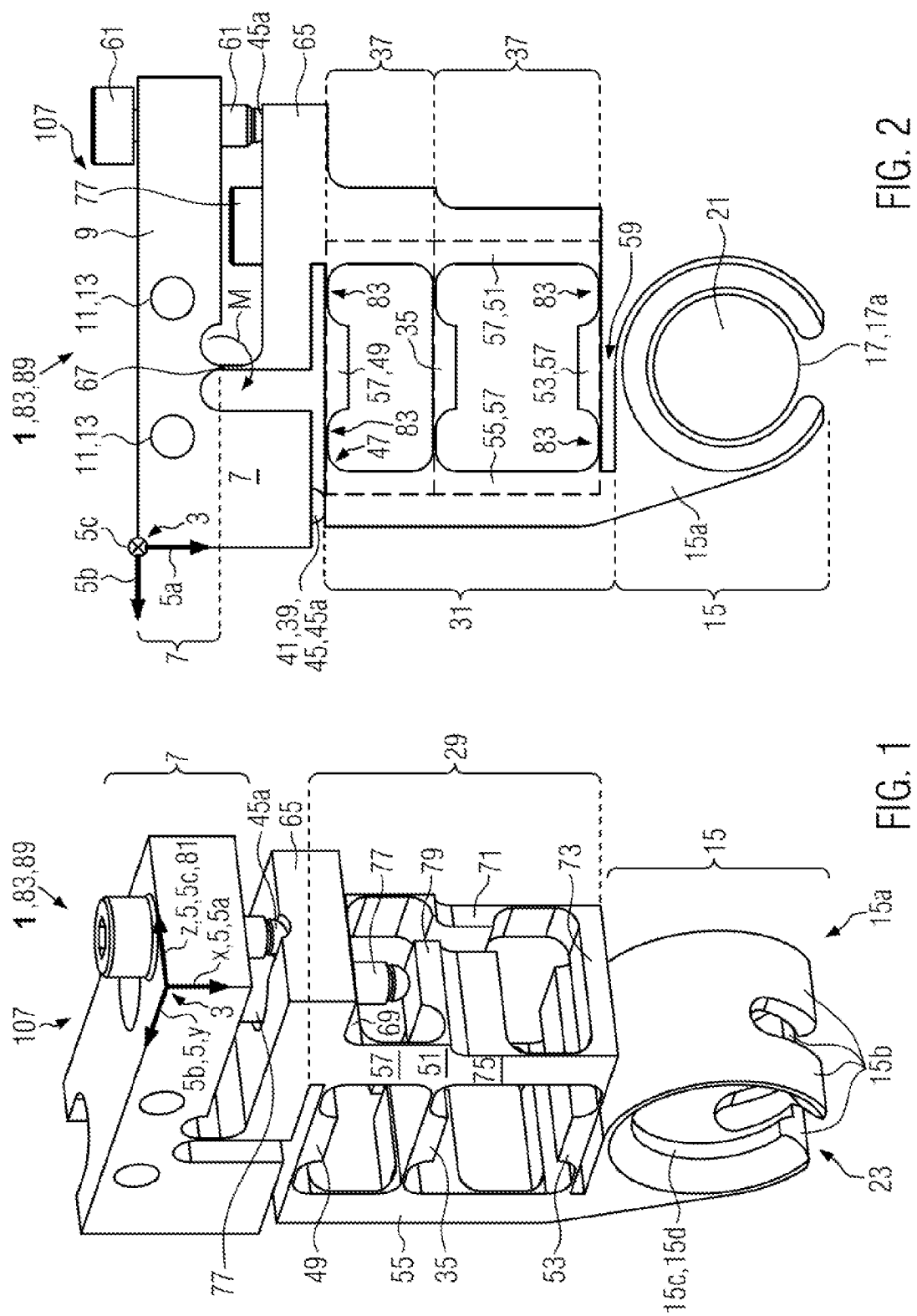

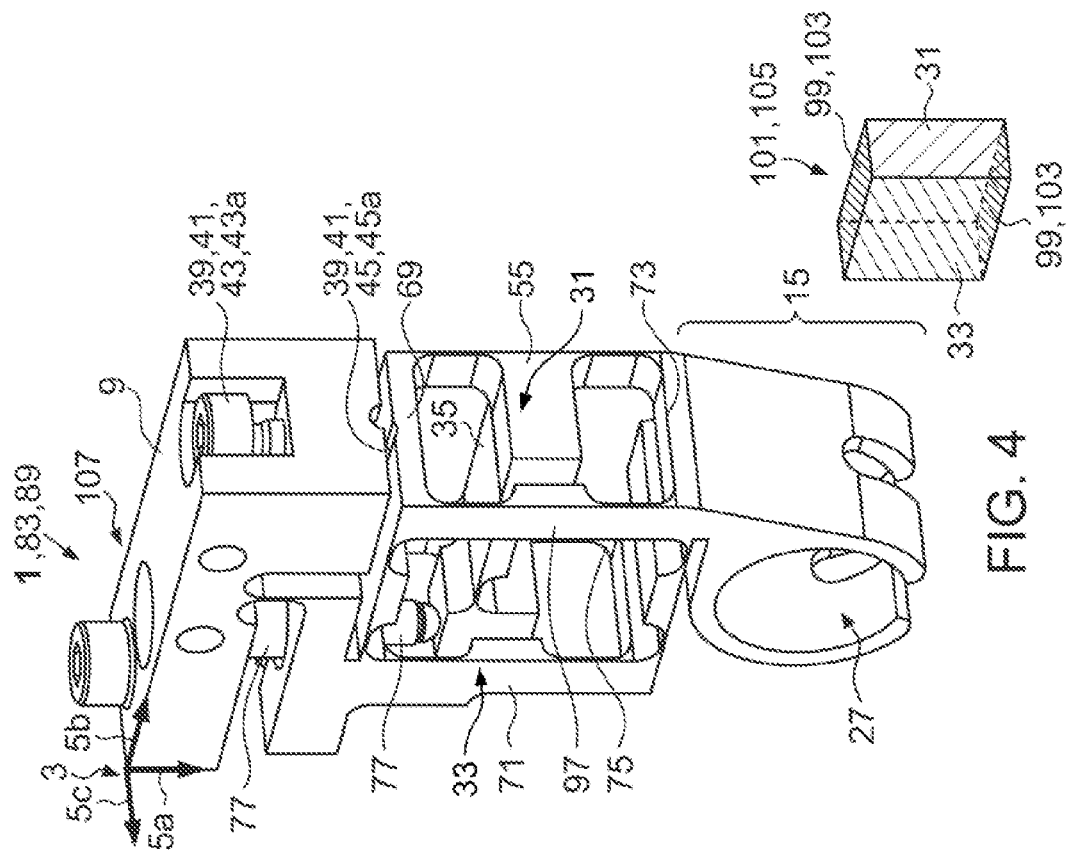
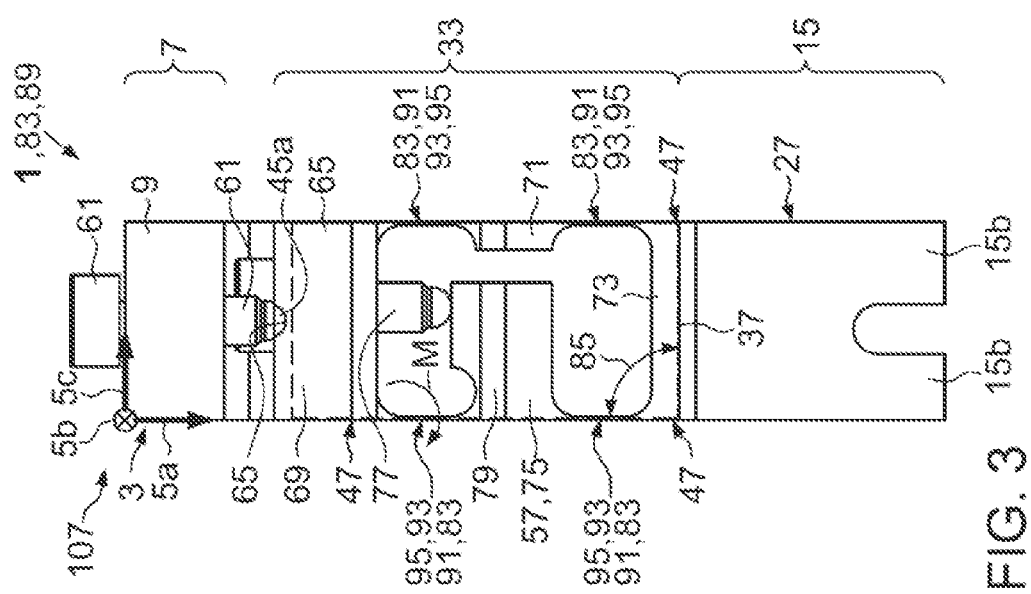

ADJUSTABLE MECHANICAL HOLDER FOR FINELY ADJUSTING THE POSITION OF AN ELEMENT SUCH AS A LENS

CROSS-REFERENCE TO PRIOR APPLICATION

Priority is claimed to German Patent Application No. DE 10 2018 216 951.9, filed on Oct. 2, 2018, the entire disclosure of which is hereby incorporated by reference herein.

FIELD

The invention relates to an adjustable mechanical holder for finely adjusting the position of an element attachable or attached to the holder, in particular of an optical element such as a lens. The mechanical holder comprises a stationary fastening region for fastening the mechanical holder to a holding structure, and a holding region for mounting of the element.

BACKGROUND

Mechanical holders or mountings for the mounting of elements, such as, for instance, sensors, measuring heads, holding elements for cables or optical waveguides or optical elements, such as, for instance, lenses, are known from the prior art. Thus, for instance, lens mounts are known, which, purely by way of example, can have a plate-like holding region, in which the lens is accommodated and fastened, wherein the plate-like holding region is pivotable via actuators about rotational axes lying in the plane of the holding region. The actuators generally have supports, which are tensioned via a tensioning element, for instance a spring, against the actuators connected to the stationary fastening region. Mechanical holders from the prior art are thus of complicated construction and require, moreover, a precise coordination of the built-in parts, with the result that they are often unusable in applications offering very little available installation space, since they are too large.

SUMMARY

In an embodiment, the present invention provides an adjustable mechanical holder for finely adjusting a position of an element attachable or attached to the mechanical holder. The mechanical holder includes a stationary fastening region configured to fasten the mechanical holder to a holding structure and a holding region configured as a mounting for the element. At least a first parallelogram linkage is disposed between the holding region and the fastening region. The first parallelogram linkage connects the holding region movably to the fastening region. The mechanical holder further includes a first movable actuator, by which the holding region is movable by the first parallelogram linkage along a first spatial direction.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 shows a first perspective view of an embodiment of the mechanical holder according to the invention;

FIG. 2 shows a front view of the mechanical holder of FIG. 1;

FIG. 3 shows a side view of the mechanical holder of FIG. 1;

FIG. 4 shows a second perspective view of the mechanical holder of FIG. 1;

DETAILED DESCRIPTION

Figure 5:
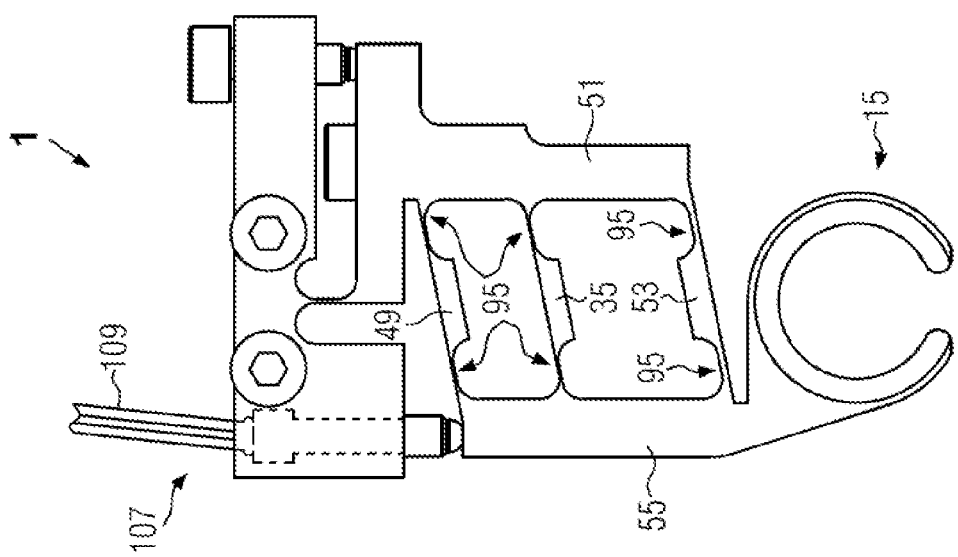
FIG. 5 shows an illustration of the adjustment of the mechanical holder along the first spatial direction: rest position.

In an embodiment, the present invention provides an adjustable mechanical holder which has a simple and compact construction, can be quickly and cheaply produced, and is easy to handle.

The adjustable mechanical holder which is mentioned in the introduction achieves these advantages according to an embodiment of the present invention by virtue of the fact that between the holding region and the fastening region is provided at least a first parallelogram linkage, which connects the holding region movably to the fastening region, and that there is further provided a first movable actuator, by means of which the holding region is movable by the first parallelogram linkage along a first spatial direction.

A mechanical holder according to an embodiment of the invention has a simple structure and can be produced very compactly and cheaply.

Further embodiments of the invention which are individually advantageous are described in greater detail below. The technical features cited in the embodiments can be combined with one another in any desired manner, or even omitted insofar as the technical effect produced with the omitted technical feature is without importance.

A movable actuator should be understood in this disclosure as a mechanically movable system which can generate a motion. This motion can be used to move relative to a fixed base an element connected in a motion-transmitting manner to the actuator, more accurately to a movable part of the actuator.

Screws are an example of simple mechanical actuators, wherein, preferredly, adjusting screws or micrometer screws are used, since these, due to a, in comparison to standard threads (for instance metric threads), lesser thread pitch, enable a more precise movement of the actuator, and consequently of the element to be moved. The screws, adjusting screws or micrometer screws which are used can have, for instance, an actuating element, for example in the form of a manually actuatable screw head, which can be actuated by a user in order to move the movable part of the actuator.

Examples of such manually actuatable screws are knurled-head screws or thumb screws. In addition, actuators which, with the aid of electric motors, enable a movement of the actuator, can also be provided. These can be operated and controlled by a control apparatus, for instance a control computer, with appropriate commands which are assigned to the movement of the actuator.

By a parallelogram linkage should be understood a mechanical system by means of which elements fastened to an arm or branch remain in the original angle of inclination (in the plane of the movement of the arm), even when the arm is tilted along a path.

A parallelogram linkage is constructed in the form of a parallelogram, i.e. possesses respectively two pairs of parallel sides or branches, wherein the branches are arranged such that they are tiltable relative to one another. Furthermore, the branches cannot be altered in length either by stretching or by compression, so that, given a fixed location of a first branch and tilting of a second branch arranged adjacent to the first branch, a fourth branch, lying parallelly opposite the second branch, is tilted identically to the second branch, merely parallelly offset. A third branch, which lies opposite the first branch, remains in parallel orientation to the first branch, yet is spatially offset according to the tilting of the second and fourth branch.

Equally, the actuator can transmit a linear motion instead of a pivot motion to the branch, that is to say that the actuator can be oriented and movable substantially along the orientation of the branch and moves this branch in the actuating direction. In the above (arbitrary and non-restrictive) designation of the branches, the thus moved branch corresponds to the fourth deflected branch.

The first actuator according to the invention preferredly realizes such a deflection of a branch, wherein, furthermore, the holding region is moved jointly with the fourth branch and thus the deflection of the holding region is realized. In such a case, the second branch lying opposite the moved fourth branch remains stationary, whereas the first and third branches located between the stationary second branch and the linearly moved fourth branch are tilted. These remain parallel to one another in the course of this tilting.

The above used numbering of the branches is purely exemplary and not restrictive. In the used numbering, the second and fourth branch extend between the fastening region and the holding region, whereas the first branch is arranged in the vicinity of the fastening region, and the third branch in the vicinity of the holding region. The branches are numbered clockwise and form a parallelogram.

In particular, the first spatial direction can correspond to the actuating direction, i.e. be oriented parallel thereto.

The first movable actuator can be actuatable from an actuating side, i.e. can point toward this actuating side.

By a fine adjustment should be understood a possible adjustment of the holding region within the range of a few micrometers to a few millimeters. An overall field of adjustment of an actuator can lie within the range of a few millimeters.

The holding structure can be, for instance, an apparatus in which an element is intended to be held in a movable, i.e. adjustable, manner. The holding region can be designed complementary to the element to be accommodated.

In a further embodiment of the mechanical holder according to the invention, a second movable actuator can be provided, wherein the second movable actuator is connected in a motion-transmitting manner to a flexurally rigid cantilever arm, via which a torque can be transmitted to at least one branch of the first parallelogram linkage, whereby the holding region is movable by the first parallelogram linkage along a second spatial direction.

The first parallelogram linkage can thus be used to, by means of the first actuator, move the holding region along a first spatial direction and, by means of the second actuator, move the holding region along the second spatial direction.

In particular, the first and second spatial direction can be oriented perpendicular to one another.

Particularly preferredly, the second movable actuator, too, can be actuatable from the actuating side, so that both actuators, the first and the second actuator, point toward the actuating side and can be accessible and actuatable from this side.

It can additionally be advantageous if, in a further embodiment, at least that branch which can be subjected to the torque, for instance the second branch, is rotatable about a rotational axis.

A rotational axis has the advantage that the rotation of the second branch subjected to the torque is defined by this rotational axis, so that the rotation takes place in one plane. This rotational plane can, in particular, correspond to the plane in which all branches of the first parallelogram linkage lie.

The torque only produces a rotation if a rotational axis is provided. The rotational axis can be located between the parallelogram linkage and the fastening region and can be formed, in particular, by a hinge or a region of reduced flexibility. Such a region is realized, for instance, by the use of softer material, or by the reduction of the material thickness in the region of the rotational axis.

For instance, a film hinge, which can connect the flexurally rigid cantilever arm to the stationary fastening region, can be provided.

The flexurally rigid cantilever arm can merge, in particular, into the second branch, which is to be rotated, of the parallelogram linkage. The connection of the parallelogram linkage to the fastening region can thus take place via this rotational axis or tilting point.

In particular, the system consisting of cantilever arm and second branch can be flexurally rigid relative to the plane of the first parallelogram linkage, so that, due to the configuration as a parallelogram, an angular deflection, i.e. tilting, of the second branch can also be transmitted to the opposite fourth branch.

In one embodiment, the rotational axis can lie outside the parallelogram linkage. In this case, the first actuator can serve as a support for the first branch of the first parallelogram linkage. The first branch, facing toward the fastening region, of the parallelogram linkage can be movable such that it slides along this support. In this sliding movement of the first branch along the support formed by the first actuator, an angle between the first and second, and between the third and fourth branch, diminishes. Due to the parallelogram mechanism, the third branch is moved substantially along the second spatial direction.

In a further embodiment, the rotational axis can also be located in a corner point of the parallelogram, i.e. at a position at which two adjacent branches are movably connected to one another. For instance, such a rotational axis can be arranged in the corner point between the first and second branch. If, in this embodiment, the second branch, as a result of the torque which acts on the branch, rotates clockwise about the rotational axis, then the first branch remains stationary. A sliding mounting on the first actuator does not take place in this embodiment.

In another advantageous embodiment of the mechanical holder, between the holding region and the fastening region can be provided at least a second parallelogram linkage, which connects the holding region movably to the fastening region, wherein, in addition, a third, movable actuator can be provided, by means of which the holding region, independently of a deflection of the first parallelogram linkage, is movable by the second parallelogram linkage along a third spatial direction. Such an embodiment has the advantage that an element attachable or attached to the holder can be moved in all three spatial directions, which advantageously are oriented perpendicular to one another, i.e. can be positioned in space. This embodiment thus constitutes an adjustable, mechanical three-dimensional holder.

In a particularly preferred embodiment of the mechanical holder according to the invention, also the third movable actuator can be actuatable from the actuating side, so that all three actuators point toward the actuating side and can be accessible and actuatable from this side. This has the advantage that an adjustment of the mechanical holder in all three spatial directions is possible from a single side of the holder, i.e. for instance from the actuating side.

In particular, the second parallelogram linkage can be oriented perpendicular to the first parallelogram linkage.

In addition, in a further embodiment, a flexurally rigid second cantilever arm, which extends from a branch of the second parallelogram linkage in a depth direction, can be provided, wherein the depth direction is oriented substantially perpendicular to the first parallelogram linkage, wherein, by the flexurally rigid second cantilever arm, a torque can be transmitted to at least one branch of the second parallelogram linkage, whereby the holding region is movable by the second parallelogram linkage along the third spatial direction.

The second parallelogram linkage can be constructed analogously to the first parallelogram linkage. In this context, it is particularly advantageous if a branch of the second parallelogram linkage and a branch of the first parallelogram linkage, the second branch, are identical.

In order to avoid confusions—likewise without limitation of generality—the branches of the second parallelogram linkage shall below be referred to as fifth, sixth, seventh and eighth branches. The numbering is realized, analogously to the procedure with the first parallelogram linkage, clockwise, and starting with the branch arranged close to the fastening region. In such a numbering, the second branch of the first parallelogram linkage can correspond to the eighth branch of the second parallelogram linkage.

The flexurally rigid second cantilever arm can be arranged on the sixth or eighth branch and extend parallel to the fifth or seventh branch of the second parallelogram linkage.

Upon actuation of the third actuator, a torque is consequently transmitted to the sixth (or eighth) branch, which branch gives rise to a rotation of the branch subjected to the torque. Due to the parallelogram mechanism, this rotation is also transmitted to the respectively other branch, i.e. the eighth (or sixth) branch.

The fifth branch of the second parallelogram linkage, close to the fastening region, remains stationary, whereas the seventh branch, while maintaining the parallelism to the fifth branch, is deflectable along the third spatial direction.

The rotation of the sixth or eighth branch can take place about a second rotational axis, which can be oriented perpendicular to the first rotational axis. If, in the preceding explanation, reference is made only to one rotational axis, then by this is explicitly meant the first rotational axis, about which the second branch is rotatable.

The second rotational axis can, particularly preferredly, be arranged within the second parallelogram linkage. This has the advantage that, upon rotation of the eighth (or sixth) branch, no parallel displacement of the fifth or seventh branch takes place.

Particularly preferredly, in a further embodiment of the mechanical holder according to the invention, the second cantilever arm can be arranged within the second parallelogram linkage.

In particular, in this embodiment it is further advantageous if the first parallelogram linkage has a central cantilever arm branch, which is arranged within the first parallelogram linkage and divides the parallelogram linkage into two sub-parallelograms and to which the second cantilever arm is fastened.

Such a cantilever arm branch can constitute a supporting structure, which, on the one hand, transmits the torque introduced by the third actuator also to the fourth branch of the first parallelogram linkage, and also transmits a tilting of the second branch to the fourth branch. Furthermore, such a supporting structure has the advantage that use can be made of an interior formed by the branches of the second parallelogram linkage, so that a compact mechanical is obtained.

The cantilever arm branch thus supports the construction of the parallelogram linkages, so that a distortion in the parallel branches can be minimized or prevented.

According to a further embodiment, the parallelogram linkages can be monolithically connected to one another. In particular, the parallelogram linkages can also be monolithically connected to the fastening region and/or the holding region.

Thus the mechanical holder can comprise metal and be produced from a metal blank by machine cutting, for example milling.

In another advantageous embodiment, the first parallelogram linkage and/or the second parallelogram linkage has/have at least, in each case, four joint regions, wherein, by the joint regions, an angle between adjacent branches of the corresponding parallelogram linkage can be changed.

The joint regions can preferredly be arranged in the vicinity of the corner points of the parallelogram linkage.

In particular, in a parallelogram linkage, two branches can be arranged in a flexurally rigid manner parallel to one another. In the case of the first parallelogram linkage, these are the second and fourth branch, in the case of the second parallelogram linkage the fifth and seventh branch. These pairs of branches are held parallel to one another by a further pair of further branches. Each branch is preferredly connected at its ends to respectively a further branch, via at least one joint region.

In one embodiment of the mechanical holder, the joint regions of the branches of the parallelogram linkage can be formed by a region of reduced rigidity.

A region of reduced rigidity can be attained, for instance, by a locally diminished (for instance by mechanical, chemical or optical treatment of the material) material hardness and/or reduced material thickness in comparison to the surrounding material.

In particular, the joint regions can be deflectable in a reversibly elastic manner. This is ensured, for example, if these are configured as a film hinge or film joint or a spring connection. In addition, the joint regions can be pretensioned, which is possible by means of the actuators. In other words, a production state of the mechanical holder, in particular the location of the branches of the parallelogram linkage after the production of the holder, cannot correspond to the zero position during operation of the mechanical holder.

Such a pretensioning can serve to ensure that the mechanical holder is adjustable respectively in both directions of the spatial directions.

In particular, in one embodiment of the mechanical holder according to the invention, only the first and the third actuator can be used to pretension the corresponding joint regions. A pretension set with the first actuator can, for instance, be sufficient to pretension the first cantilever arm against the second actuator.

Preferredly, the joint regions are configured as film hinges which are deflectable in a reversibly elastic manner. However, the joint regions can also, for instance, be formed by an axis and a complementary fork. Such an embodiment has the advantage that the plane within which the change of angle between adjacent branches is adjustable is clearly defined, and a rotation of a branch out of this plane is prevented by such a structure of the joint region.

In order to counteract a possible lower torsional rigidity of the film hinges, in a further embodiment of the mechanical holder there can be provided at least one supporting branch, which is connected to the first and the second parallelogram linkage. Such a supporting branch can lessen or prevent an undesirable distortion, for instance a differing rotation of the second and fourth branch of the first parallelogram linkage out of the plane of the parallelogram linkage.

In a further embodiment, the first parallelogram linkage, the second parallelogram linkage and the supporting branch can form approximately a movable parallelepiped, which movably connects the fastening region to the holding region.

Such a parallelepiped can be construed as a structure composed of a plurality of parallelogram linkages. In one embodiment, each of the six sides of the parallelepiped can be a parallelogram linkage.

In a particularly preferred embodiment, the parallelepiped can in the zero position be described as a cube or cuboid. This has the advantage that a deflection of the holding region along one of the spatial directions approximately with only slight deviations can be regarded as a linear motion.

Since a parallelepiped consisting of, all in all, six parallelogram linkages is overdetermined, in a further embodiment of the mechanical holder according to the invention the branches of the first and of the second parallelogram linkage, which branches are respectively facing toward the fastening region and/or the holding region, respectively form a closed side face of a parallelepiped, wherein the side faces are angularly fixed. Such an embodiment has the advantage that the mechanical holder is torsionally rigid, and thus also readily flexible spring joints, which enable an easy adjustment (i.e. with low effort by the user) of the position of the holding region, can be used.

Due to the design of the mechanical holder with closed side faces, respectively two mutually parallelly arranged parallelograms of the parallelepiped can be construed as a respectively single parallelogram linkage, since these mutually parallelly arranged parallelograms are coupled or synchronized, in terms of their motion, by the side faces.

Since the side faces are angularly fixed, these do not, moreover, form a third parallelogram linkage.

In a further embodiment of the mechanical holder according to the invention, the holding region can be fastened to a branch of the first parallelogram linkage and mechanically decoupled from the further branches of the parallelogram linkage. Preferredly, the holding region can be fastened to the fourth branch of the first parallelogram linkage. A fastening to only one branch has the advantage that, via the joint regions, branches which are deflectable relative to one another are freely deflectable, and no additional mechanical limitation of the deflection of a branch due to the holding region occurs.

In another advantageous embodiment of the mechanical holder according to the invention, all actuators can be accessible from one side of the mechanical holder.

Such an embodiment has the advantage that the mechanical holder, even with little available installation space and, in particular, with restricted accessibility to this installation space, can be built in and operated.

The accessibility of all three actuators from one side of the mechanical holder, in particular from the actuating side, is realized by the construction, orientation and arrangement of the two parallelogram linkages and of the flexurally rigid cantilever arm.

As a result of the two parallelogram linkages, it can be achieved that motions generated by the three actuators, and forces resulting therefrom, all act in a common direction. As a result of the construction of the mechanical holder, each of the three forces acting in the common direction can, however, be converted into preferredly mutually perpendicular motions of the element attachable or attached to the holder.

All three actuators can thus point toward a single side, in particular the actuating side, and yet still enable a movement of the element attachable or attached to the holder in different spatial directions.

The conversion of the three forces of the three actuators, which forces act in the common direction, into respective, preferredly mutually perpendicularly made, motions is thus based on the arrangement of the parallelogram linkages on the flexurally rigid cantilever arm, with corresponding rotational axes and points of support (along which a branch can be displaced).

Each of the three forces generated by the respective actuators and acting in the common direction acts on a different position of the construction of the mechanical holder. This leads to a respectively different deflection of this same. The first actuator brings about, for instance, a tilting of the second branch, whereas an actuation of the second actuator does not lead to a change in the location and position of the second branch, yet causes a change in position of the fourth branch, while the parallelism thereof to the second branch is maintained and changes of angle of the first and third branch relative to the second and fourth branch are made.

An actuation of the third actuator results in a bending or tilting of the first parallelogram linkage out of its original plane or into this.

In this process, internal angles of the first parallelogram linkage are not altered. The actuation of the third movable actuator for the displacement of the second parallelogram linkage resembles that movement of the first parallelogram linkage which is realized by actuation of the first actuator.

What is different in both motions are, however, the rotational axis and the orientation of the planes of the parallelogram linkages in space. Both the two corresponding rotational axes and the two corresponding planes are preferredly oriented perpendicular to one another.

The mechanical holder can thus itself be fastened in a type of pocket or depression of an apparatus and is nevertheless adjustable, from the one opening, in all three spatial directions.

In addition, a single tool opening can be provided, via which, for instance, a screwdriver or hex key can be applied to the mechanical holder in order to adjust this in any desired spatial direction for the purpose of fine adjustment.

Particularly preferredly, the fastening region, the holding region and the two parallelogram linkages of the adjustable holder according to the invention are of monolithic configuration, the holding region is adjustable via three independent actuators in three mutually perpendicular spatial directions, and all actuators are accessible from just one side of the holder.

The adjustable holder according to an embodiment of the invention shall be described in greater detail below with reference to exemplary drawings. The drawings represent merely a specific embodiment of the claimed mechanical holder. In the drawings, technical features and technical features of same function are labeled with the same reference symbols. Individual technical features can be combined with one another as desired, and/or omitted insofar as the technical effect produced with the omitted technical feature is without importance.

The adjustable mechanical holder 1 is represented from different perspectives in FIGS. 1 to 4. The following description relates to these four figures, wherein, at a suitable point, reference is made to the visibility of technical features in individual figures.

In the figures, a cartesian system of coordinates 3 is respectively delineated. This shows three spatial directions 5, which are oriented perpendicular to one another and can be described by the x-axis x, the y-axis y and the z-axis z. The notation of the three spatial directions 5 is purely exemplary and not chosen restrictively, that is to say that systems of coordinates 3 which deviate from the here chosen definition of the spatial directions 5 are also embraced by the present disclosure.

The positive direction of the x-axis constitutes, on a purely exemplary and non-restrictive basis, a first spatial direction 5a. Correspondingly, a second spatial direction 5b is oriented along the y-axis, and a third spatial direction 5c along the z-axis.

The mechanical holder 1 extends, in particular, along the first spatial direction 5a, has a lesser extent along the second spatial direction 5b, and the least extent along the third spatial direction 5c.

The mechanical holder 1 comprises a stationary fastening region 7, which is fastenable, for instance, to a holding structure 7a (see FIG. 5). In the shown embodiment of the mechanical holder 1, the stationary fastening region 7 is an L-shaped torsionally rigid body 9, which, in the shown embodiment, has two fastening openings 11 in the form of bores 13.

The mechanical holder 1 further comprises a holding region 15, in which an element 17, in particular an optical element 19, such as a lens 21, can be accommodated (see FIG. 2). The holding region 15 can have a holding structure 15a, for instance in the form of a plurality of holding fingers 15b, and a stop 15c, here in the form of a wall 15d.

The wall 15d is found at one end 23 of a cylindrical holding volume 25, which is located between the holding fingers 15b or is defined by these. The holding volume 25 is accessible, counter to the third spatial direction 5c, via a holding opening 27 (see FIG. 4), via which the element 17 is insertable into the holding region 15, wherein the element 17 bears against the wall 15d, thereby ensuring a predefined location and/or orientation of the element 17.

Viewed along the first spatial direction 5a, between the fastening region 7 and the holding region 15 is found at least one parallelogram linkage 29.

A first parallelogram linkage 31 is delineated in FIG. 2 and illustrated by a dashed line. The first parallelogram linkage 31 is divided by a cantilever arm branch 35 into two sub-parallelograms 37, wherein the sub-parallelograms 37 are likewise represented by the dashed line or drawn separately.

By means of the first parallelogram linkage 31, the fastening region 7 is connected to the holding region 15 in a motion-transmitting manner, i.e. movably. In other words, by virtue of the first parallelogram linkage 31, a position 17a of the element 17 can be varied by changing of the position 17a of the holding region 15 relative to the fastening region 7.

Such a variation of the position 17a can be realized by a first actuator 39. The first actuator 39 is discernible in FIG. 2 and FIG. 4, wherein the first actuator 39 is configured as a micrometer screw 41. The micrometer screw 41 has an actuating end 43 and a support end 45. The actuating end 43 is, for instance, a screw head 43a, which can be actuated with a tool (see FIG. 5 to FIG. 10), and the support end 45 is a ball seat 45a.

The first actuator 39 is oriented along the first spatial direction 5a, and likewise movable along this first spatial direction 5a.

The ball seat 45a lies on a corner 47 which is formed by a first branch 49 and a fourth branch 55. Parallel to the first branch 49 is arranged a third branch 53, and parallel to the fourth branch 55 a second branch 51. These four branches 57 form the first parallelogram linkage 31.

In the first spatial direction 5a, the fourth branch 55 opens out into the holding structure 15a of the holding region 15. The holding region 15 is thus connected by this branch 5, i.e. the fourth branch 55, to the first parallelogram linkage 31, and mechanically decoupled from further branches 57, in particular from the third branch 53.

Between the third branch 53 and the holding structure 15a is arranged an interspace 59. Into this interspace 59 can be moved the third branch 53.

In addition, the mechanical holder 1 has a second actuator 61, which is designed similarly to the first actuator 39. The second actuator 61 rests with its ball seat 45a in a guide groove 63 of a flexurally rigid cantilever arm 65.

The second actuator 61, too, is oriented along the first spatial direction 5a and movable in this.

Via the second actuator 61, a torque M, which acts on a first rotational axis 67, can be transmitted to the flexurally rigid cantilever arm 65 and to at least one branch 57 of the first parallelogram linkage 31. In particular, the torque M is transmitted to the second branch 51.

The acting torque M brings about a rotation of the flexurally rigid cantilever arm 65 about the first rotational axis 67, whereby the holding region 15 is movable along the second spatial direction 5b. This motion is later explained in greater detail with reference to FIG. 7 and FIG. 8.

The shown embodiment of the mechanical holder 1 according to the invention further comprises a second parallelogram linkage 33, which is shown in FIG. 3 and is represented by a dashed line.

The second parallelogram linkage 33 likewise has four branches 57, which, in order to avoid confusions, are referred to as fifth branch 69, sixth branch 71, seventh branch 73 and eighth branch 75.

The second parallelogram linkage 33, too, is arranged between the holding region 15 and the fastening region 7 and connects the holding region 15 movably to the fastening region 7.

Via a third actuator 77, the holding region 15, independently of a deflection of the first parallelogram linkage 31, is deflectable by the second parallelogram linkage 33 along the third spatial direction 5c.

The third actuator 77, too, is oriented and movable along the first spatial direction 5a.

The third actuator 77 bears against a flexurally rigid second cantilever arm 79, which extends from a branch 57, in particular from the eighth branch 75, of the second parallelogram linkage 33 in a depth direction 81, which corresponds to the z-axis or the third spatial direction 5c.

The depth direction 81 is, in particular, oriented perpendicular to the first parallelogram linkage 31.

By means of the third actuator 77, a torque M can be transmitted by the flexurally rigid second cantilever arm 79 to a branch 57, in particular the eighth branch 75, whereby the holding region 15 is movable by the second parallelogram linkage 33 along the third spatial direction 5c.

As is evident particularly from FIG. 3, the second cantilever arm 79 extends into the second parallelogram linkage 33.

In a further embodiment, the second cantilever arm 79 can also be arranged on the sixth branch 71 and extend from this in the third spatial direction 5c.

The mechanical holder 1 shown in the figures is a monolithic holder 83, that is to say that the fastening region 7, the holding region 15, and the two parallelogram linkages 31 and 33 are monolithically connected to one another and have been produced, for instance, from a blank by milling.

As can be seen in the figures, the second cantilever arm 79 is fastened to the cantilever arm branch 35, wherein the cantilever arm branch 35 is arranged centrally within the first parallelogram linkage 31.

The branches 57 both of the first parallelogram linkage 31, and of the second parallelogram linkage 33, have at least, in each case, four joint regions 83. These are delineated in the views of FIG. 2 and FIG. 3.

The joint regions 83 are preferredly arranged in the vicinity of the corners 47 of the respective parallelogram linkage 31, 33. In FIG. 2, just one corner 47, in FIG. 3, for the sake of clarity, only three corners 47, are delineated.

The joint regions 83 allow the changing of an angle 85 between the branches 57 of the two parallelogram linkages 31, 33.

In a rest state 89 of the mechanical holder 1, which state is shown in FIG. 1 to FIG. 4, the angle 85 amounts to substantially 90°. The angle 85 is delineated, only in FIG. 3, between the seventh branch 73 and the eighth branch 75.

Due to the configuration as a parallelogram 37, diagonally opposite angles 85 are equal in size. The two remaining angles can be determined in a simple manner by means of the internal angle of a quadrilateral.

The joint regions 83 are formed by regions of reduced rigidity 91. In other words, in these regions either a lower material hardness is provided, and/or a lower material thickness, in comparison to the material or thickness of the viewed branch 57.

In the shown embodiment of the mechanical holder 1, the reduced rigidity is realized by regions of reduced material thickness 93, so that the joint regions 83 are provided in the form of reversibly elastically deflectable film joints 95.

The film joints 95 are delineated only in FIG. 3 for the second parallelogram linkage 33, though the joint regions 83 of the first parallelogram linkage 31 are likewise configured as film joints 95.

In FIG. 4 is further shown a supporting branch 97, which is connected to the first parallelogram linkage 31 and the second parallelogram linkage 33. This supporting branch 97 serves primarily to couple the branches 57, which are connected via the film joints 95, movably to one another, without the occurrence of a distortion, i.e. for instance a different deflection of the second 51 and the third branch 57 relative to one another.

For this purpose, those branches 57 of the first 31 and the second parallelogram linkage 33 that are facing toward the fastening region 7 and the holding region 15 can form, in particular, a closed side face 99 of a thus shaped parallelepiped 101. The side faces 99 are here angularly fixed, that is to say that, viewed in the direction of the first spatial direction 5a, no parallelogram linkage 29 is formed.

For the illustration of the parallelepiped 101 and the angularly fixed, closed side faces 99, these are represented schematically alongside the mechanical holder 1 in FIG. 4. The closed side faces 99 are delineated by means of a hatching 103. Preferredly the parallelepiped 101 is a cuboid 105, since a deflection of the branches 57 thus leads to an approximately linear deflection along one of the three spatial directions 5a, 5b and 5c.

As can be seen from FIG. 1 to FIG. 4, all actuators 39, 61 and 77 are accessible along the third spatial direction 5a and accessible from a single side 107, an actuating side 107.

Below, with reference to FIG. 5 to FIG. 10, in each case individually, the deflection of the mechanical holder 1 according to the invention along each of the three spatial directions 5a, 5b and 5c is described.

Figure 6:
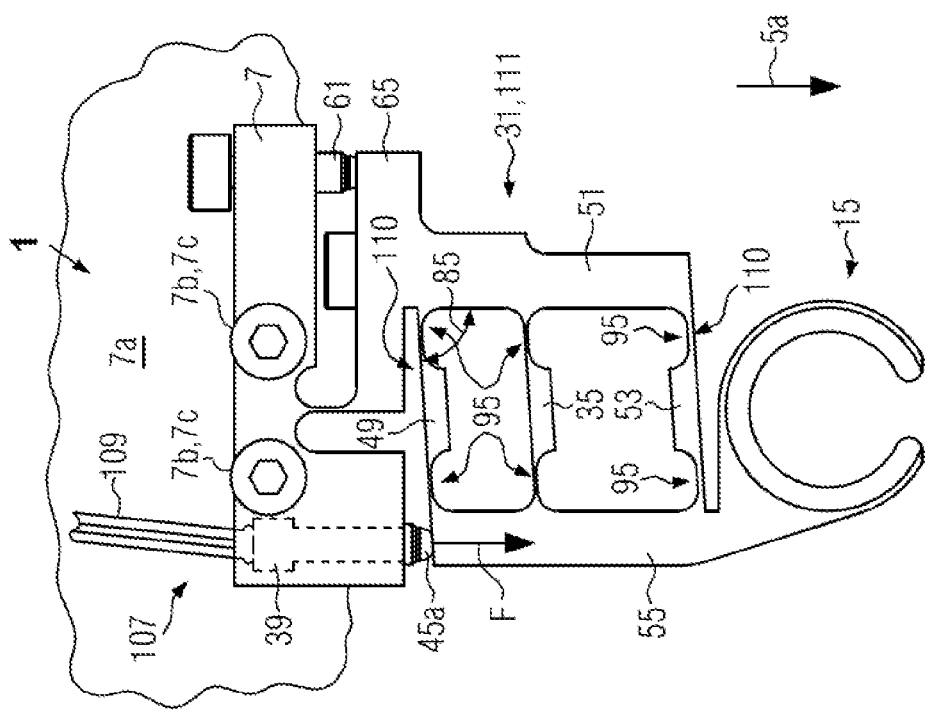
FIG. 6 shows an illustration of the adjustment of the mechanical holder along the first spatial direction: deflected position.

FIG. 5 and FIG. 6 describe the deflection of the holding region 15 along the first spatial direction 5a.

FIG. 5 further shows the fastening of the fastening region 7 to the holding structure 7a (for instance to a wall) by means of fastening elements 7b, in the case shown: two screws 7c.

For a movement of the holding region 15 along the first spatial direction 5a, the first actuator 39 (this is concealed by the L-shaped torsionally rigid body 9 and is therefore delineated in dashed representation) is actuated by means of a tool 109 and screwed in the first spatial direction 5a into the mechanical holder 1.

The ball seat 45a exerts a force F along the first spatial direction 5a on the fourth branch 55 of the first parallelogram linkage 31.

Due to the first cantilever arm 65, the second branch 51 is immovable, via the second actuator 61, in relation to the stationary fastening region 7.

As a result of the force F, each of the film joints 95 is henceforth elastically and reversibly deflected, so that the fourth branch 55 moves in the first spatial direction 5a and, in so doing, tilts the first 49 and the third branch 53 by virtue of the film joints 95. Since the holding region 15 is connected to the fourth branch 55, this also moves along the first spatial direction 5a.

If the representation of the mechanical holder 1 of FIG. 5 is compared with that of FIG. 2, then a slight inclination 110 both of the first 49 and of the third branch 53 can be discerned. In other words, the angle 85 between the first branch 49 and the second branch 51 is less than 90°. This stems from the fact that, by means of the first actuator 39, a pretensioning 111 has been applied to the first parallelogram linkage 31. This enables the first actuator 39 to be moved counter to the first spatial direction 5a, whereupon the holding region 15 also moves in this direction.

Insofar as that orientation of the mechanical holder 1 that is shown in FIG. 2 is regarded as a zero position, a movement of the first actuator 39 counter to the first spatial direction 5a merely causes the first actuator 39 to move away from the fourth branch 55 without, however, inducing a movement of the fourth branch 55 counter to the first spatial direction 5a.

In the motion shown in FIG. 5 and FIG. 6, a parallelism between the second 51 and fourth branch 55 is maintained. Equally, the first branch 49, the cantilever arm branch 35 and the third branch 53 are oriented parallel to one another throughout the motion.

Figure 7:
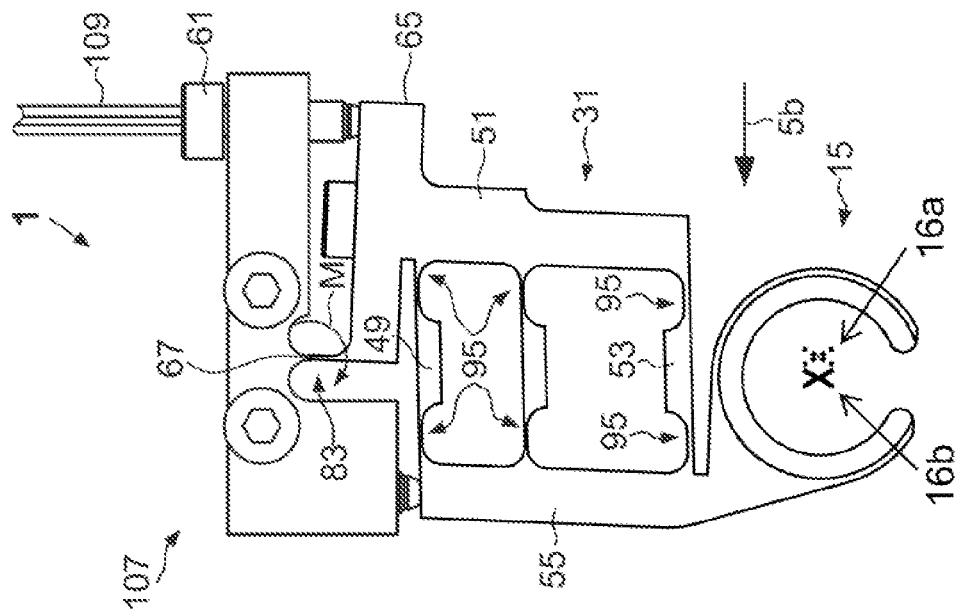
FIG. 7 shows an illustration of the adjustment of the mechanical holder along the second spatial direction: rest position.
Figure 8:
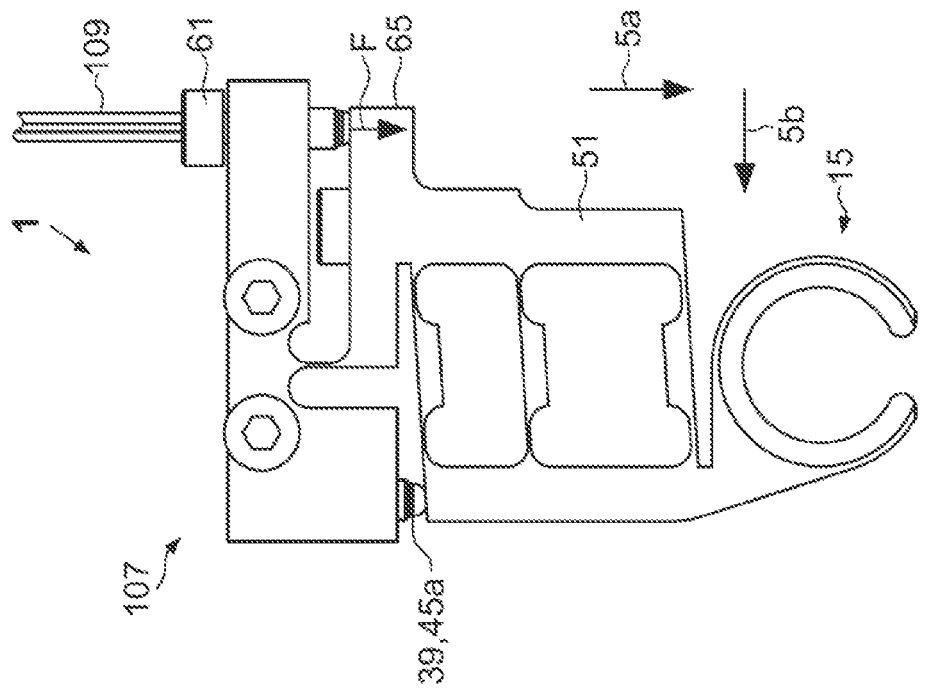
FIG. 8 shows an illustration of the adjustment of the mechanical holder along the second spatial direction: deflected position.

In FIGS. 7 and 8, a movement of the holding region 15 along the second spatial direction 5b is shown.

For such a motion, the second actuator 61 is actuated by means of the tool 109, in particular is screwed along the first spatial direction 5a into the mechanical holder 1.

Due to the rotatable mounting of the first cantilever arm 65 and of the second branch 51 fixedly connected thereto, the force F exerted by the second actuator 61 on the first actuator arm 65 gives rise to a torque M, which acts on the rotational axis 67.

This torque M gives rise to a rotation of the first cantilever arm 65 and of the second branch 51 about the rotational axis 67.

This rotation means that the first branch 49, which bears against the ball seat 45a of the first actuator 39, is displaced substantially along the second spatial direction 5b along the ball seat 45a.

Equally, the third branch 53 is displaced parallel to the first branch 49 substantially along the second spatial direction 5b.

The fourth branch 55 is oriented, during this motion, parallel to the second branch 51.

In this motion, on the one hand a joint region 83 between the fastening region 7 and the first cantilever arm 65, as well as the film hinges 95 of the first parallelogram linkage 31, is/are deflected.

The holding region 15 is shifted by the second actuator 61 along the second spatial direction 5b. This is represented symbolically by a first central position 16a and a second central position 16b of the holding region 15. The first central position 16a here constitutes a center of the holding region 15 in the setting of the holder 1 of FIG. 7 and is represented with a cross drawn with dotted lines. Correspondingly, the cross drawn with a continuous line symbolizes the second central position 16b, i.e. the center of the holding region 15 in the setting shown in FIG. 8. The holding region is thus shifted along the second spatial direction 5b by the extent of the distance between the first 16a and the second central position 16b. This displacement is shown purely symbolically, the amount of the same is thus not true to scale.

With respect to the pretensioning 111 described in the previous figures, it should at this point be noted that a motion along the second spatial direction 5b can benefit from the pretensioning 111 of the first actuator 39, and thus no further pretensioning 111 by the second actuator 61, which pretensioning pretensions the joint region 83 in the region of the first rotational axis 67, is necessary.

Figure 10:
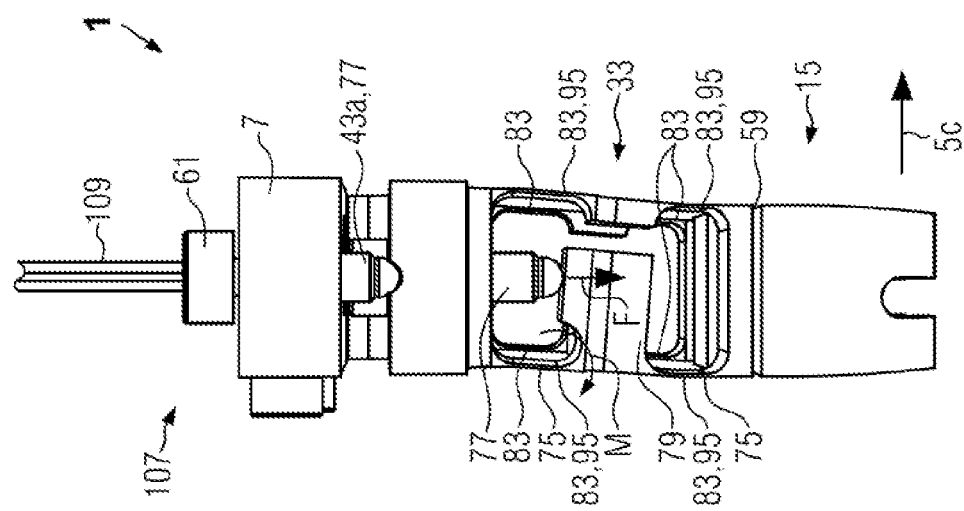
FIG. 10 shows an illustration of the adjustment of the mechanical holder along the third spatial direction: deflected position.
Figure 9:
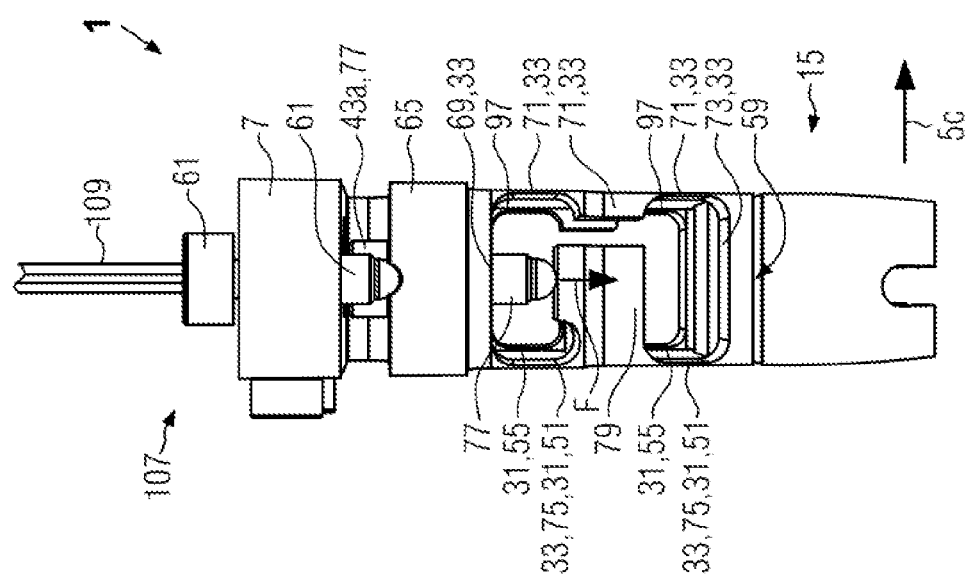
FIG. 9 shows an illustration of the adjustment of the mechanical holder along the third spatial direction: rest position.

By means of FIG. 9 and FIG. 10, an adjustment of the mechanical holder 1 counter to the third spatial direction 5c is shown.

In the lateral representation of the mechanical holder 1, the fastening region 7, the second actuator 61, the first cantilever arm 65, the second 51 and fourth branch 55 of the first parallelogram linkage 31, and the fifth 69, sixth 71, seventh 73 and eighth branch 75 of the second parallelogram linkage 33, are shown. The eighth branch 75 of the second parallelogram linkage 33 corresponds to the second branch 51 of the first parallelogram linkage 31.

In addition, the interspace 59, which separates the third branch 53 of the first parallelogram linkage 31 from the holding region 15, is discernible. Equally, the supporting branch 97 is discernible.

The tool 109 actuates the screw head 43a of the third actuator 77 and exerts the force F on the second cantilever arm 79. This gives rise to a torque M, which elastically deflects the joint regions 83, i.e. the film hinges 95 of the second parallelogram linkage 33, and rotates the eighth branch 75 of the second parallelogram linkage 33.

Due to the arrangement as a parallelogram, the joint regions 83 or the film hinges 95 of the fourth branch 55 of the first parallelogram linkage 31 or of the supporting branch 97 are also elastically and reversibly deflected.

By virtue of the third actuator 77 and the thereby induced torque M, and the following rotation of the sixth 71 and eighth branch 75, a movement of the holding region 15 is made counter to the third spatial direction 5c.

The previously described motions along the spatial directions 5a, 5b and 5c are independent of one another. That is to say that any desired linear combination of the individual motions along the three spatial directions 5a, 5b and 5c (or counter to the third spatial direction 5c) can be realized by the mechanical holder 1 according to the invention. The combination of the deflections can be realized sequentially or simultaneously.

As is evident from FIG. 5 to FIG. 10, the access to the respective actuators 39, 61, and 77 is gained respectively from one and the same side 107, so that the mechanical holder 1 must be accessible for actuation just from this one side 107. Furthermore, the mechanical holder 1, by virtue of its monolithic design, is very compact.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SYMBOLS 1 mechanical holder
3 cartesian system of coordinates 5 spatial directions
5a first spatial direction
5b second spatial direction
5c third spatial direction
7 stationary fastening region
7a holding structure
7b fastening element
7c screw
9 L-shaped torsionally rigid body
11 fastening opening
13 bore
15 holding region
15a holding structure
15b holding finger
15c stop
15d wall
16a first central position
16b second central position
17 element
17a position
19 optical element
21 lens
23 end
25 holding volume
27 holding opening
29 parallelogram linkage
31 first parallelogram linkage
33 second parallelogram linkage
35 cantilever arm branch
37 sub-parallelogram
39 first actuator
41 micrometer screw
43 actuating end
43a screw head
45 support end
45a ball seat
47 corner
49 first branch
51 second branch
53 third branch
55 fourth branch
57 leg
59 interspace
61 second actuator
63 guide groove
65 flexurally rigid cantilever arm
67 first rotational axis
69 fifth branch
71 sixth branch
73 seventh branch
75 eighth branch
77 third actuator
79 flexurally rigid second cantilever arm
81 depth direction
83 joint region
85 angle
89 rest state
91 region of reduced rigidity
93 region of reduced material thickness
95 film joint
97 supporting branch
99 closed side face
101 parallelepiped
103 hatching
105 cuboid
107 side
109 tool
110 inclination
111 pretension
F force
M torque
x x-axis
y y-axis
z z-axis

What is claimed is:

1. An adjustable mechanical holder for finely adjusting a position of an element attachable or attached to the mechanical holder, the mechanical holder comprising:
   a stationary fastening region configured to fasten the mechanical holder to a holding structure;
   a holding region configured as a mounting for the element;
   at least a first parallelogram linkage disposed between the holding region and the fastening region, the first parallelogram linkage connecting the holding region movably to the fastening region; and
   a first movable actuator, by which the holding region is movable by the first parallelogram linkage along a first spatial direction.

2. The mechanical holder as claimed in claim 1, further comprising a second movable actuator connected in a motion-transmitting manner to a flexurally rigid cantilever arm, via which a torque is transmittable to at least one branch of the first parallelogram linkage, whereby the holding region is movable by the first parallelogram linkage along a second spatial direction.

3. The mechanical holder as claimed in claim 2, wherein the at least one branch which is subjectable to the torque is rotatable about a rotational axis.

4. The mechanical holder as claimed in claim 2, further comprising:
   at least a second parallelogram linkage disposed between the holding region, the second parallelogram linkage connecting the holding region movably to the fastening region; and
   a third actuator, by which the holding region, independently of a deflection of the first parallelogram linkage, is movable by the second parallelogram linkage along a third spatial direction.

5. The mechanical holder as claimed in claim 4, further comprising a flexurally rigid second cantilever arm, which extends from a branch of the second parallelogram linkage in a depth direction, wherein the depth direction is oriented substantially perpendicular to the first parallelogram linkage, wherein, by the flexurally rigid second cantilever arm, a torque is transmittable to at least one branch of the second parallelogram linkage, whereby the holding region is movable by the second parallelogram linkage along the third spatial direction.

6. The mechanical holder as claimed in claim 5, wherein the second cantilever arm is arranged within the second parallelogram linkage.

7. The mechanical holder as claimed in claim 4, wherein the parallelogram linkages are monolithically connected to one another.

8. The mechanical holder as claimed in claim 6, wherein the first parallelogram linkage has a central cantilever arm branch, which is arranged within the first parallelogram linkage and divides the parallelogram linkage into two sub-parallelograms, and to which the second cantilever arm is fastened.

9. The mechanical holder as claimed in claim 1, wherein the first parallelogram linkage and/or the second parallelogram linkage has/have at least, in each case, four joint regions, wherein, by the joint regions, an angle between adjacent branches of the corresponding parallelogram linkage is adjustable.

10. The mechanical holder as claimed in claim 9, wherein the joint regions of the branches of the parallelogram linkage are formed by a region of reduced rigidity.

11. The mechanical holder as claimed in claim 4, further comprising at least one supporting branch which is connected to the first parallelogram linkage and to the second parallelogram linkage.

12. The mechanical holder as claimed in claim 11, wherein the branches of the first and of the second parallelogram linkage respectively face toward the fastening region and/or the holding region and respectively form a closed side face of a parallelepiped, and wherein the side faces are angularly fixed.

13. The mechanical holder as claimed in claim 1, wherein the holding region is fastened to a branch of the first parallelogram linkage and mechanically decoupled from other branches of the first parallelogram linkage.

14. The mechanical holder as claimed in claim 2, wherein the first and second actuators are each accessible from one side of the mechanical holder.

15. The mechanical holder as claimed in claim 1, wherein the element is an optical element.

16. The mechanical holder as claimed in claim 15, wherein the optical element is a lens.

17. The mechanical holder as claimed in claim 1, further comprising:
    at least a second parallelogram linkage disposed between the holding region, the second parallelogram linkage connecting the holding region movably to the fastening region; and
    a third actuator, by which the holding region, independently of a deflection of the first parallelogram linkage, is movable by the second parallelogram linkage along a third spatial direction.

* * * * *